United States Patent [19]

Niethammer

[11] 3,963,988
[45] June 15, 1976

[54] CIRCUIT ARRANGEMENT FOR SELECTING A DIVERSITY CHANNEL

[75] Inventor: Dieter Niethammer, Munich, Germany

[73] Assignee: Siemens Aktiengesellschaft, Berlin & Munich, Germany

[22] Filed: Dec. 2, 1974

[21] Appl. No.: 528,725

[30] Foreign Application Priority Data

Dec. 6, 1973 Germany............................ 2360929

[52] U.S. Cl. .................................. 325/56; 325/40; 325/304; 340/146.1 AG
[51] Int. Cl.² .............................................. H04B 7/02
[58] Field of Search .................. 325/39, 40, 47, 56, 325/61, 139, 301, 302, 321, 304, 2, 3.31; 343/178, 203, 205; 340/146.1 AG; 179/15 BS

[56] References Cited
UNITED STATES PATENTS

| | | |
|---|---|---|
| 3,628,149 | 12/1971 | Swan...................................... 325/56 |
| 3,665,395 | 5/1972 | Bochmann............................ 325/56 |
| 3,781,794 | 12/1973 | Morris................................... 325/56 |
| 3,829,777 | 8/1974 | Muratani et al. ..................... 325/56 |

*Primary Examiner*—Robert L. Griffin
*Assistant Examiner*—Jin F. Ng

[57] ABSTRACT

A circuit arrangement in a data transmission system for selecting a diversity channel is described. The transmitted information and parity bits are applied in the receiver, over a channel switch and a code frame switch in serial fashion, to a parity bit register and an information bit register. Inputs to a first parity stage are connected to outputs of a number of cells of a first part of the parity bit register and to n1 cells of a first part of the information bit register. A code frame switch connects each channel to a second part of the parity bit register and a second part of the information bit register. A number of cells of the second part of the information bit register and the output of the first parity stage are connected to a further parity stage assigned to each diversity channel. The outputs of the further parity stages are connected to a quality evaluation stage which produces control signals with which the channel switch switches through one of the diversity channels.

5 Claims, 8 Drawing Figures

CIRCUIT ARRANGEMENT FOR SELECTING A DIVERSITY CHANNEL

BACKGROUND OF THE INVENTION

The invention relates to a circuit arrangement for selecting in a data transmission system a diversity channel over which data is transmitted in the form of parity bits and information bits. Two or more diversity channels can be provided over which the data are transmitted in accordance with a space diversity process, time diversity process or frequency diversity process. At the transmitting end the items of data can be coded in the form of a convolutional code or a block code so that data faults are detected on the basis of received parity bits and information bits.

It is known to use diversity processes to improve the quality of the data transmission and to reduce the fault rate. The best transmission channel at one particular time can be found by measuring the receiving level of the signal transmitted over the individual channels and determining the highest level. Consequently, one switches through the channel which at a given time is transmitting the signal with the highest level. This known process does not always lead to the desired success, and in particular does not, when signals from an alien transmitter are transmitted at a high level across a channel. This is particularly disadvantageous when the alien transmitter is an interfering transmitter, so that it is the very channel which should under no circumstances be switched through which is given special preference. In such a case it can be advantageous to select the channels not in dependence upon the receiving level, but in dependence upon the received code words. When the parity words are dependent upon a large number of information bits, even the construction of one single channel will require a relatively large expenditure to be able to recognize any transmission faults. If not only one single channel, but a plurality of diversity channels must be checked, a proportionately greater cost must be expected.

An object of the invention is to provide a circuit arrangement of the type described hereinabove by means of which one of the diversity channels may be selected with a relatively low cost.

SUMMARY OF THE INVENTION

In accordance with the invention, the foregoing and other objects are achieved in that the inputs of a parity stage in a receiver are connected to outputs of $m1$ cells of a first part of the parity bit register and to $n1$ cells of a first part of the information bit register. The diversity channels are connected via a code frame switch to the inputs of a second part of the parity bit register and a second part of the information bit register. Here, $m2$ cells of the second part of the parity bit register, $n2$ cells of the second part of the information bit register and the output of the parity stage are connected to a further parity stage assigned to each diversity channel, and the number $m$ is equal to the sum of the numbers $m1$ and $m2$ and the number $n$ is equal to the sum of the numbers $n1$ and $n2$. Also the ouputs of the further parity stages are connected to a quality evaluation stage which produces control signals with which the channel switch switches through one of the diversity channels.

The circuit arrangement in accordance with the invention is characterised by a low cost for construction, because the first part of the parity bit register provided at the receiving end and the first part of the information bit register provided at the receiving end are used to check all the diversity channels. This advantage is of particular significance when the receiving end, first part of the information bit register is composed of hundreds of storage cells.

If data faults are to be detected employing a convolutional code and a syndrome is to be formed, this is made possible with a low additional cost by employing a second parity stage. At the input end of this second parity stage are connected the outputs of the first parity stage and individual cells of the second parts of the parity bits register and of the information bit register. The output of the second parity stage emits the syndrome by means of which data faults can be corrected employing a fault correction stage.

BRIEF DESCRIPTION OF THE DRAWINGS

In the following preferred embodiments of the invention will be described making reference to FIGS. 1 through 3, in which identical components appearing in more than one Figure have been provided with like references. These figures are described briefly below.

DETAILED DESCRIPTION OF THE DRAWINGS

Figure 1:
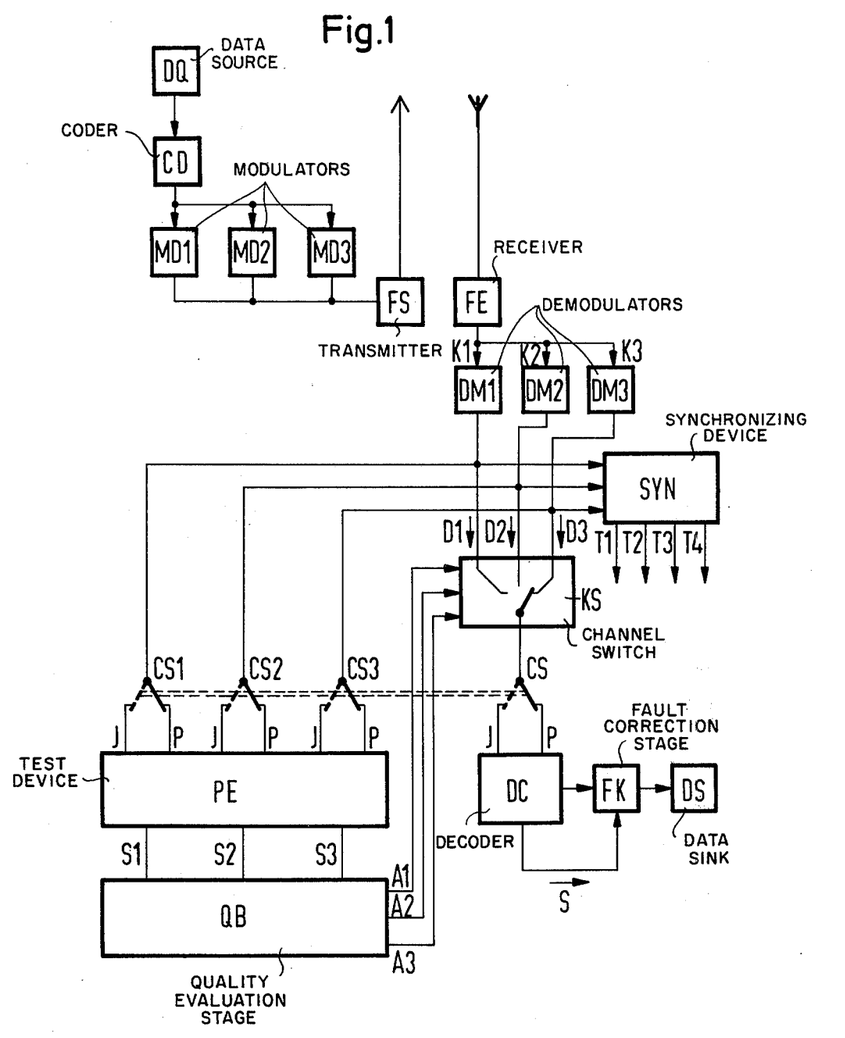
FIG. 1 is a block schematic diagram of a first preferred embodiment of a circuit arrangement for selecting a diversity channel.

FIG. 1 shows a data transmission system composed of a data source DQ, a coder CD, modulators MD1, MD2, MD3, radio transmitter FS, radio receiver FE, demodulators DM1, DM2, DM3, synchronizing device SYN, test device PE, quality evaluation stage QB, channel switch KS, code frame switches CS, CS1, CS2, CS3, decoder DC, fault correction stage FK and data sink DS.

The data source can, for example, be a teleprinter which emits consecutively the individual bits of a character. The coder CD recodes the data supplied to its input in such manner that it emits a sequence of information bits and parity bits. The information bits correspond to the data supplied by the data source, whereas the parity bits are used to recognize and correct data faults.

The modulators MD1, MD2, MD3 produce carriers which are modulated by the coder output. The frequencies of these carriers differ and lie within the speech frequency band of 0.3 to 3.4 kHz. The outputs of the modulators are connected to one another so that the radio transmitter FS obtains a signal mixture which is formed from the modulated carriers. In the radio transmitter FS a frequency conversion from the speech band into a short wave band is effected and, after power amplification, is emitted.

The radio receiver FE receives the signal mixture and emits its output signal over three channels K1, K2, K3 to the demodulators DM1, DM2, DM3. The signals D1, D2, D3 of the demodulators are conducted to the test device PE and to the channel switch KS. The test device PE1 produces test signals S1, S2, S3 which signal the instantaneous quality of the channels. The control signals A1, A2, A3 emitted by the quality evaluation stage serve to switch the channel switch KS, and thus, one of the channels K1, K2, K3 is connected to the decoder DC. The output of the decoder is connected via the fault correction stage FK to the data sink DS which can, for example, be a teleprinter.

Figure 2:
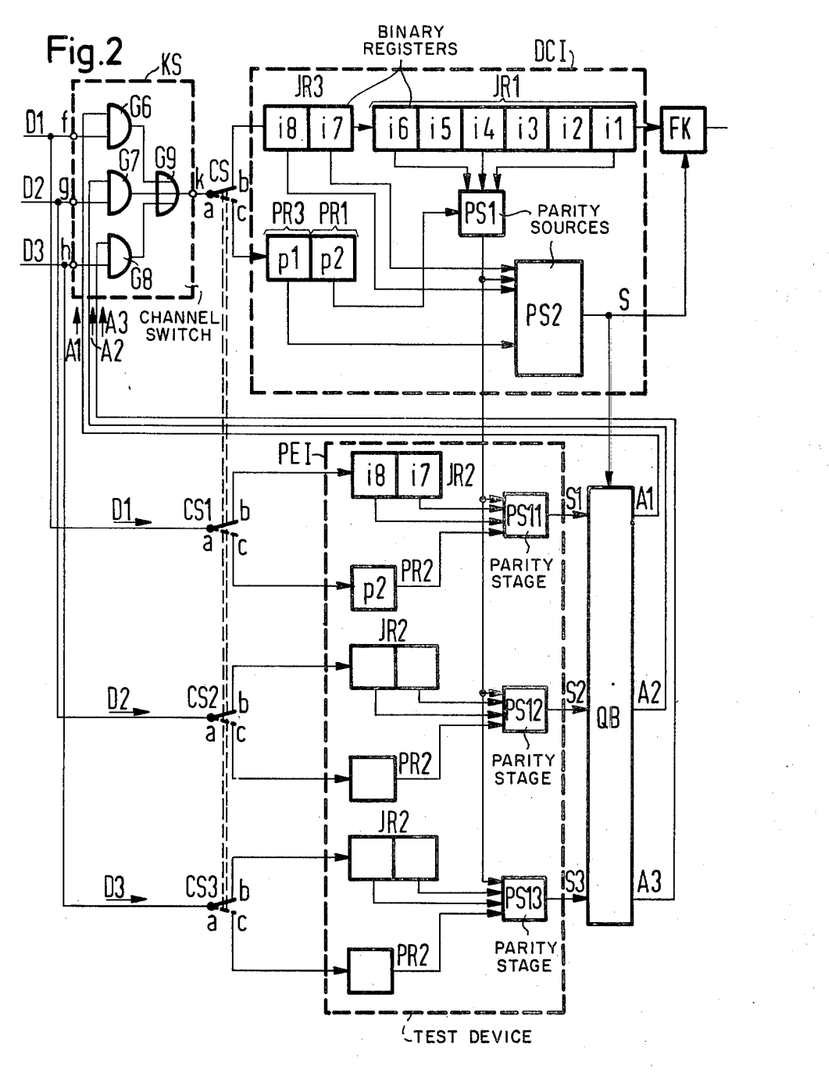
FIG. 2 is a schematic diagram illustrating in more detail a channel switch, a decoder, and a test device as used in the circuit arrangement illustrated in FIG. 1.

FIG. 2 shows in more detail the channel swtich KS, the decoder DCI and the test device PEI. The channel switch KS comprises AND gates G6, G7, G8 and OR gate G9 which, in dependence upon the control signals A1, A2, A3, connect one of the inputs $f$, $g$, $h$, to the output $k$.

The decoder DCI is an exemplary embodiment of the decoder DC represented in FIG. 1, and comprises binary registers JR1, JR3, PR1, PR3 and of the parity stages PS1, PS2. The code frame switch CS is operated in such manner that the information bits are input into the registers JR3 and JR1, and the parity bits are input into the registers PR3, PR1. The parity stages PS1, PS2 emit a zero signal and a one signal, respectively, when the sum of the one values at their inputs is in each case even or odd.

The test device PEI is an exemplary embodiment of the test device PE illustrated in FIG. 1. This test device comprises registers JR2, PR2 and the parity stages of PS11, PS12, PS13 which operate similarly to the parity stages PS1, PS2. The register PR1 represents a first part and the registers PR2 represent a second part of a parity bit register. The register JR1 represents a first part and the registers JR2 represent a second part of an information bit register. To simplify the illustration, the first part JR1 is composed of a total of only 6 cells, $i1$, $i2$, $i3$, $i4$, $i5$, $i6$, whereas in practice hundreds of cells can be provided. A few of these cells, and in fact the cells $i1$, $i4$, $i6$ are connected to the parity stage PS1. Thus, in the present case a total of three cells are connected. This number is referenced $n1$.

Figure 3:
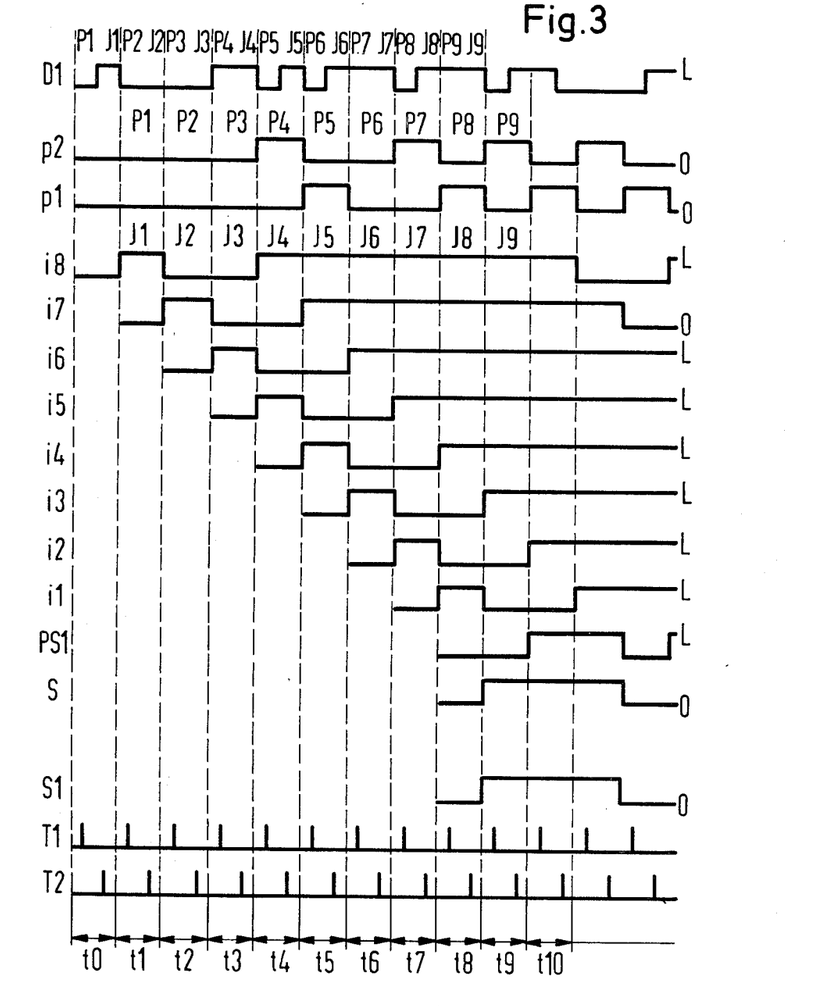
FIG. 3 is a time-waveform diagram illustrating signals which occur during the operation of the decoder and the test device illustrated in FIG. 2.

Of the first part PR1 of the parity bit registers, in the present case only one single cell $p2$ is connected to the parity stage PS1. The number of these cells of the first part PR1 which are connected to the parity stage PS1 is referenced $m1$. The number of the cells connected from the second part PR2 of the parity register is referenced $m2$. Thus, the parity stage PS1 covers $m1=1$ cells of the register PR1 and $n1=3$ cells of the register JR1. The parity state PS11 covers a total of $m1=n1$ cells via the parity stage PS1, $m2$ cells via the register PR2 and $n2$ cells via the register JR2. The registers PR3 and JR3 may be equated with the registers PR2 and JR2, respectively. In this way the parity stage PS2 also takes into account $m1+n1$ cells via the parity stage PS1, $m2$ cells of the register PR3 and $n2$ cells of the register JR3. Here, $m=m1+m2$ parity bits are dependent upon $n=n1+n2$ information bits, so that the syndrome S is emitted from the output of the parity stage PS2. The syndrome S and the signal S1 are equal to one another when the signal D1 is switched through via the channel switch KS to the code frame switch CS.

in the following the mode of operation of the circuit arrangements illustrated in FIGS. 1 and 2 will be explained with reference to the signals represented in FIG. 3. The top part of FIG. 3 shows the signal D1, consisting of the parity bits P1, P2, P3, P4, P5, P6, P7, P8, P9 and the information bits J1, J2, J3, J4, J5, J6, J7, J8, J9. Almost all the signals have the same references as the stages from which they are emitted. For example, the cell $p2$ illustrated in FIG. 2 emits the signal $p2$ represented in FIG. 3. The data transfer is carried out in a predetermined code frame governed by the times $t0$, $t1$, $t2$, $t3$, to $t9$ entered in the bottom part of FIG. 3. The signals T1 and T2 characterize, with their pulses, the switch positions, entered in broken lines and solid lines, of the code frame switches CS, CS1, CS2, CS3. During the time $t0$ the first parity bit $p1$ is input into the register PR3, in which case the code frame switch CS connects the contacts $a$ and $c$ conductively to one another. Also, during the time t0 the first information bit J1 is input into the register JR3, in which case the code frame switch CS connects the contacts $a$ and $b$ to one another. Similarly the following parity bits and information bits are also input into the registers.

The items of information stored in the cell P1 of the register PR3 and in the cell $i8$ of the register JR3 are advanced in the timing of the code frame, resulting in the production of the signals $p1$ and $i7$ to $i1$. During the time $t8$ with $i1=1$, $i4=1$, $i6=1$, $p1=1$, we have the signal $PS;1=0$. During this same time $t8$, with the signal $PS1=0$, $i7=1$, $i8=1$, $p2=0$, we have the syndrome $S=0$. As all the code frame switches CS, CS1, CS2, CS3 are switched over in the same timing of the code frame, the signal S1 is equal to the syndrome S. As the signals S1 and S signal the correct parity during the time $t8$, there is no need to switch over to another channel. During the time $t9$ with the signals $S=1$, $S1=1$ it is signalled that the received parity bit is no longer identical to the transmitted parity bit. In this case another channel can be switched through. For this purpose, with the signal D2 and D3, the signals S2 and S3 are obtained similarly to the signal S1. If it now proves that during the time $t9$ with the signals $S1=1$, $S2=0$, $S3=1$, only the second channel K2 with $S2=0$ signals the correct parity, it can be advantageous to switch through this second channel and thus the signal D2 via the channel switch KS to the code frame switch CS. The three signals S1, S2, S3 produce a total of eight different combinations and words each of the three bits which are conducted to the quality evaluation stage QB.

Figure 4:
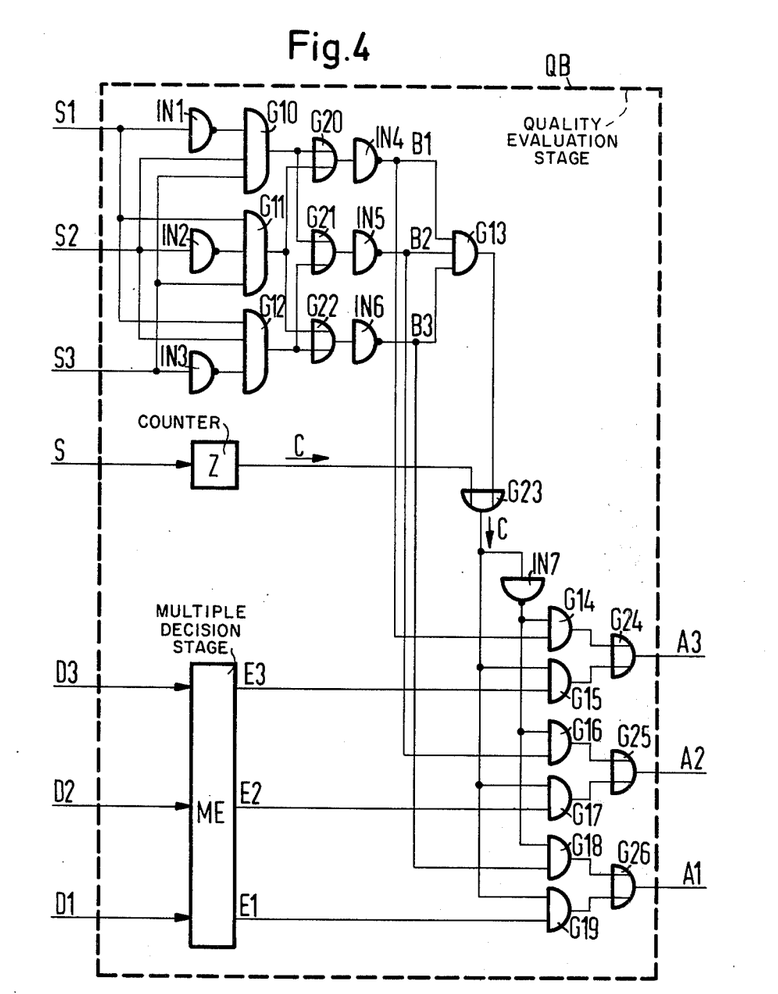
FIG. 4 is a schematic diagram illustrating the quality evaluation stage in greater detail.

FIG. 4 provides a more detailed illustration of the quality evaluation stage QB which is schematically illustrated in FIGS. 1 and 2 and comprises inverters IN1, IN2, IN3, IN4, IN5, IN6, IN7, AND gates G10, G11, G12, G13, G14, G15, G16, G17, G18, G19, OR gates G20, G21, G22, G23, G24, G25, G26, counter Z and multiple decision state ME. The gates G10, G11 and G12 emit one signals when they are supplied at their inputs with the words 011, 101, 110. lThese are the cases in which, with $S1=0$, $S2=0$ and $S3=0$, it is indicated that only in each case on channel K1, K2 or K3 is transmitting in fault-free fashion. In these cases one signals are emitted via the gates G18, G16 and G14, respectively, so that the signals A1, A2 and A3 also in each case assume a one value and connect the corresponding channel K1, K2, K3.

If in each case two of the signals S1 and $S2 = 0$, or S1 and $S3 = 0$, or S2 and $S3 = 0$, then all three signals B1, B2, $B3 = 1$, and via the inverter IN7 a zero signal is emitted which blocks the gates G14, G16, G18. In these cases the signals A1, A2, A3 are dependent upon the output signals of the gates G19, G17 and G15 which are, themselves, dependent upn the signals E1, E2, E3. The counter Z counts the number of the syndrome $S=1$ within a given test period, and when a maximum count has been reached, emits via the output the signal $C=1$ which indicates that the given count has been reached within the test period. With the signal $C = 1$, the gates G14, G16, G18 are blocked via the inverter IN7 so that now the signals A1, A2, A3 are dependent upon the multiple decision stage ME. If the number of given faults is not reached during the test period, the signal $C=0$ is emitted from the counter Z, and if a 0 signal is emitted via the gate G13, then in a following sequence via the inverter IN7 in each case a one signal is fed to the gates G14, G16, G18, and thus, the signals A1, A2, A3 are dependent upon the signals B1, B2, B3.

If two or three of the signals D1, D2, D3 are identical, it is that member of the signals E1, E2, $E3 = 1$ which corresponds to the lowest number signal of the identical signals D1, D2, D3 which is set. If, for example, the signals $D1 = 0$, $D2 = 1$, $D3 = 1$, the the signals D2 and D3 multiply agree with one another, and the signal $E2 = 1$ is emitted, which in a following sequence produces the signal $A2 = 1$ which connects the second channel, if it was not previously connected.

Figure 5:
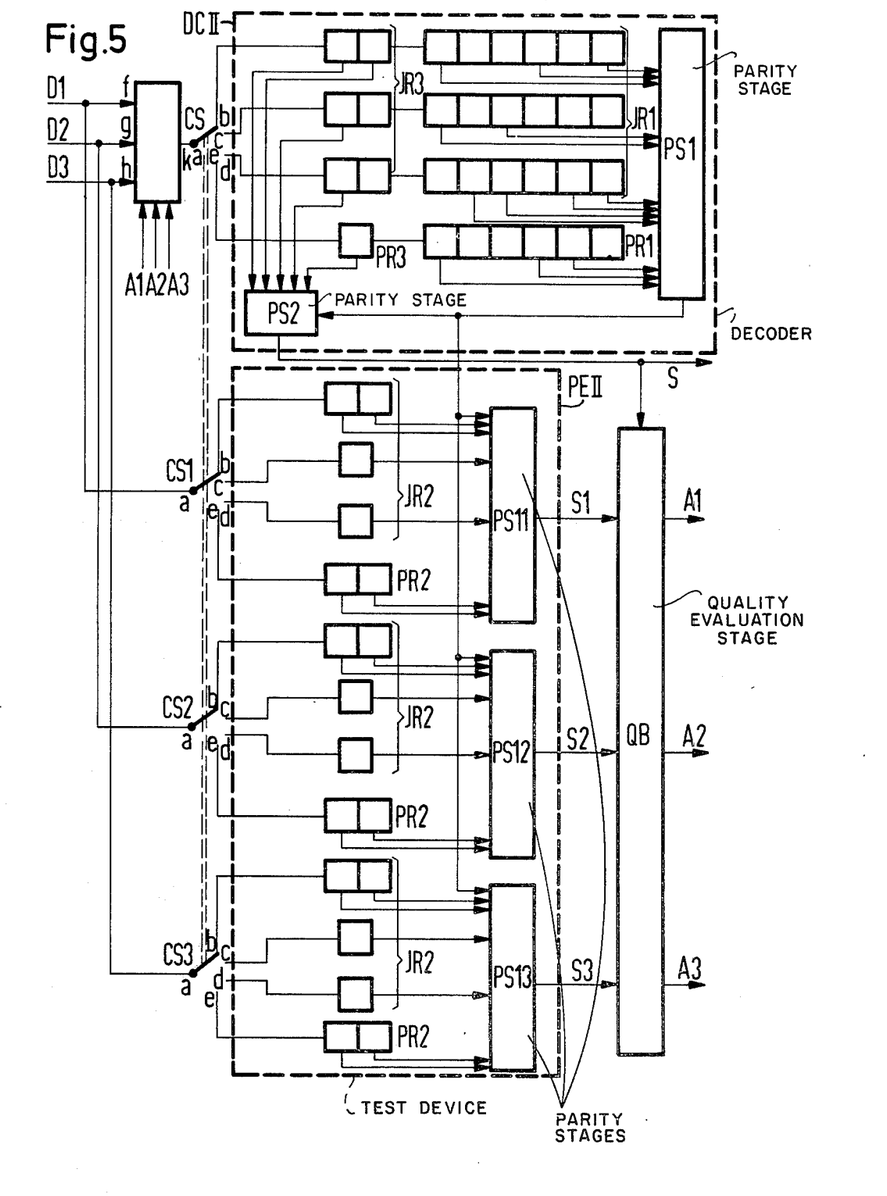
FIG. 5 is a schematic diagram illustrating a further exemplary embodiment of a decoder and a test device.

As a further exemplary embodiment of the decoder DC represented in FIG. 1, FIG. 5 represents the decoder DCII and the test device PEII which may be used in place of the tese device PE represented in FIG. 1. The code frame switches CS, CS1, CS2, CS3, represented in FIG. 1 can assume several positions of which only two positions are entered in FIG. 1 by way of simplification. In accordance with FIG. 5, these code frame switches can in each case assume four positions in which central contacts a are connected to the contacts b, c, d, e. The first part JR1 of the information bit register is now in accordance with the three contacts b, c, d of the code frame switch CS composed in each case of one register, and the register JR3 is also in each case connected by two cells to the contacts b, c, d. The contact e of the code frame switch CS is connected via the register PR3 to the first part PR1 of the parity bit register.

The second parts JR2 of the information bit register are connected to the contacts b, c, d of the code frame switches CS1, CS2, CS3. The second parts PR2 of the parity bit register are connected to the contacts e of the code frame switches CS1, CS2, CS3.

The parity stage PS1 covers $m1$ cells of the first part PR1 and $a1$ cells of the first part JR1. The second part PR2 of the parity bit register covers $m2$ cells and the second part JR2 of the information bit register covers $n2$ cells, these being connected to the assigned parity stages PS11, PS12, PS13. Thus, a total of in each case $m1 + m2 + n1 + n1$ cells are connected to these parity stages PS11, PS12, PS13 and the signals S1, S2, S3 are emitted via their outputs.

Figure 6:
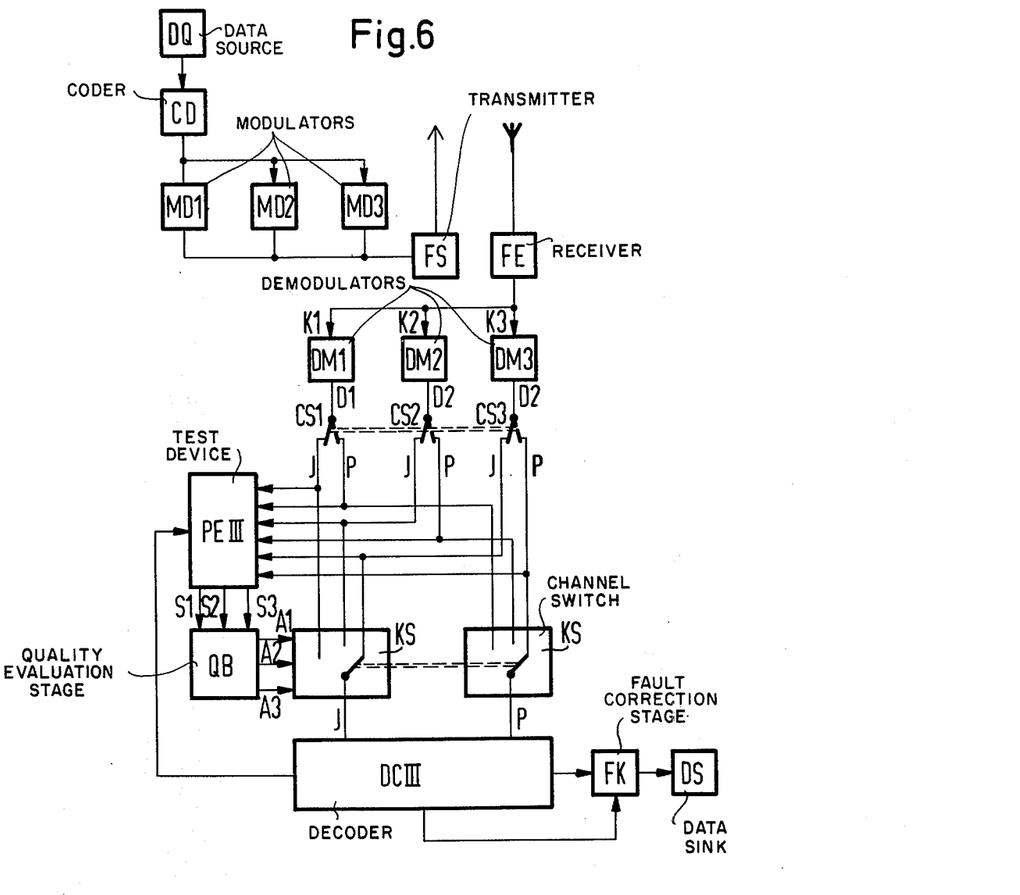
FIG. 6 is a block schematic diagram of a further preferred embodiment of a circuit arrangement for selecting diversity channels.

From the data source DQ to the demodulators DM1, DM2, DM3 FIG. 6 is identical to the circuit arrangement shown in FIG. 1, and the corresponding part of the text also applies. In accordance with FIG. 6, the signals D1, D2, D3 are conducted via the code frame switches CS1, CS2, CS3 to the test device PEIII and to the channel switches KS. Via the outputs of the two channel switches KS, the information bits J and the parity bits P are fed to the decoder DCIII. The output of this decoder DCIII is connected via the fault correction stage FK to the data sink.

Figure 7:
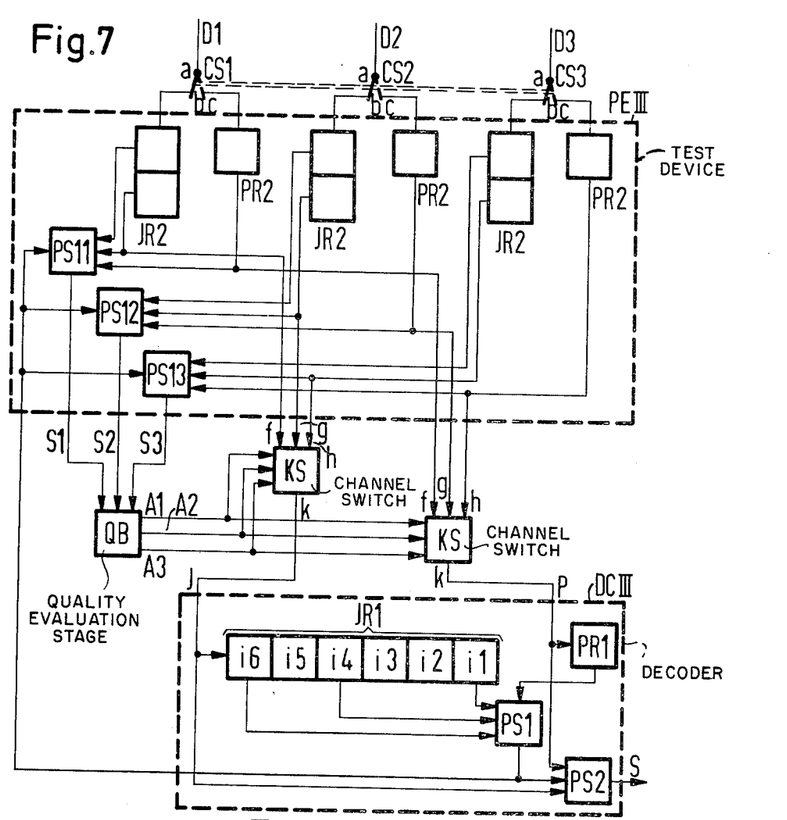
FIG. 7 is a schematic diagram providing a more detailed illustration of a test device and of a decoder which can be used in the circuit arrangement illustrated in FIG. 6

FIG. 7 shows in more detail the test device PEIII which has been schematically illustrated in FIG. 6, and also shows in more detail the decoder DCIII. The parity stage PS1 again covers M1 cells of the first part of the parity bit register and N1 cells of the first part JR1 of the information bit register. The second part PR2 of the parity bit register covers $m2$ cells, and the second part JR2 of the information bit register covers $n2$ cells, so that with the parity stages PS11, PS12, PS13 a total of $m1 + m2 + n1 + n2$ cells are taken into account. The parity stage PS2 takes into account as many cells in the case of the acquisition of the syndrome S.

The circuit arrangement illustrated in FIG. 4 can be used, for example, as quality evaluation stage QB. The channel switch KS is provided in duplicate in accordance with FIG. 7 and is represented in detail in FIG. 2.

Figure 8:
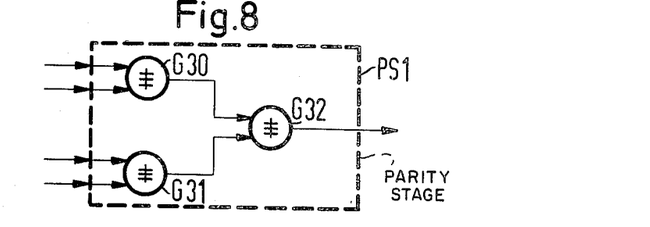
FIG. 8 is a schematic diagram giving a more detailed representation of a parity stage used in the FIG. 6 embodiment.

FIG. 8 shows in more detail the parity stage PS1, composed of the EXCLUSIVE-OR gates G30, G31, G32. In each case two input signals are, thus, conducted to one gate, and the outputs of in each case two gates open into just one gate, until finally one output only remains. The other parity stages PS2, PS11, PS12, PS13 can be designed in similar manner.

The principles of the invention are described hereinabove in terms of two preferred embodiments constructed accordingly. It is contemplated that these embodiments, as well as the signal values used, can be modified or changed while remaining within the scope of the invention as defined by the appended claims.

I claim:

1. In a data transmission system, a circuit arrangement for selecting a diversity channel over which data is transmitted, wherein a channel switch and a code frame switch are provided for coupling received parity and information bits into, respectively, a parity bit register and an information bit register and wherein a number in parity bits are dependent on a number $n$ of information bits, comprising:
   a first parity stage having inputs connected to a number $m1$ cells of a first part of said parity bit register and to a number $n1$ cells of a first part of said information bit register,
   a plurality of diversity channels,
   code frame switch means connecting each said diversity channel to inputs of a second part of said parity bit register and to inputs of a second part of said information bit register,
   a plurality of second parity stages, one of which is assigned to each said diversity channel,
   means connecting $m2$ cells of said second part of said parity bit register, $n2$ cells of said second part of said information bit register and the output of said first parity stage to inputs of each of said second parity stages, the number m being equal to $m1 + m2$ and the number n being equal to $n1 + n2$,
   channel switch means for selectively coupling said information bits and parity bits to one of said diversity channels and
   quality evaluation means for producing control signals for operating said channel switch means in dependence on the relative quality of the diversity channels.

2. The circuit arrangement defined in claim 1 wherein the outputs of said code frame switch means are connected to inputs of two channel switch means, one of which emits said information bits and the other of which emits said parity bits.

3. The circuit arrangement defined in claim 1 further comprising additional code frame switch means and wherein said plurality of diversity channels are connected by said channel switch means and said additional code frame switch means to a first part of said parity bit register and to a first part of said information bit register.

4. The circuit arrangement defined in claim 3 further comprising:
   additonal register means having inputs coupled to said additional code frame switch means and outputs coupled to said first parts of said information bit and parity bit registers.

5. The circuit arrangement defined in claim 4 wherein said second parity stage includes inputs connected to an ouput of said first parity stage and to $m2$ cells of a part of said additional register means and $n2$ cells of another part of said additonal register means, said second parity stage emitting from the syndrome from its output.

* * * * *